Nov. 5, 1968  K. D. EJNARSSON  3,409,173
WHEELED MACHINES FOR SPREADING GRANULAR PARTICLES
Filed April 18, 1966

INVENTOR.
KARL EINAR DAVID EJNARSSON
BY Young + Thompson
ATTYS.

3,409,173
WHEELED MACHINES FOR SPREADING
GRANULAR PARTICLES
Karl David Ejnarsson, Stragatan 20, Vadstena, Sweden
Filed Apr. 18, 1966, Ser. No. 543,233
2 Claims. (Cl. 222—58)

ABSTRACT OF THE DISCLOSURE

A wheeled vehicle for spreading granular particles comprises a hopper having an inclined bottom and a frame pivotally connected to the hopper at one end of the frame and connected by a pressure spring to the hopper at the other end of the frame. The vehicle wheels are mounted on the frame between the pivot and the spring, so that the spring urges the hopper upwardly about the pivot. As the load in the hopper decreases, the spring raises the hopper higher to increase the inclination of the bottom of the hopper.

---

This invention relates to a wheeled machine for spreading granular particles, e.g. a gravel spreader, which machine includes a hopper with an inclined bottom to facilitate the distribution of the granular particles from the hopper.

The inclined bottom of such a machine forms an angle to the horizontal plane, the so called sliding angle. For various reasons it is avoided to make this angle unnecessarily large, for instance in order not to decrease the volume of the hopper. However, having a certain such sliding angle, the sliding of the particles is going smoothly as long as the hopper is drawn off to a certain level, but is then more difficult, when the volume of the particles in the hopper has decreased so much that it is below this level.

The object of the present invention is to provide a wheeled machine for spreading granular particles, in which machine this disadvantage is eliminated.

Figure 1:
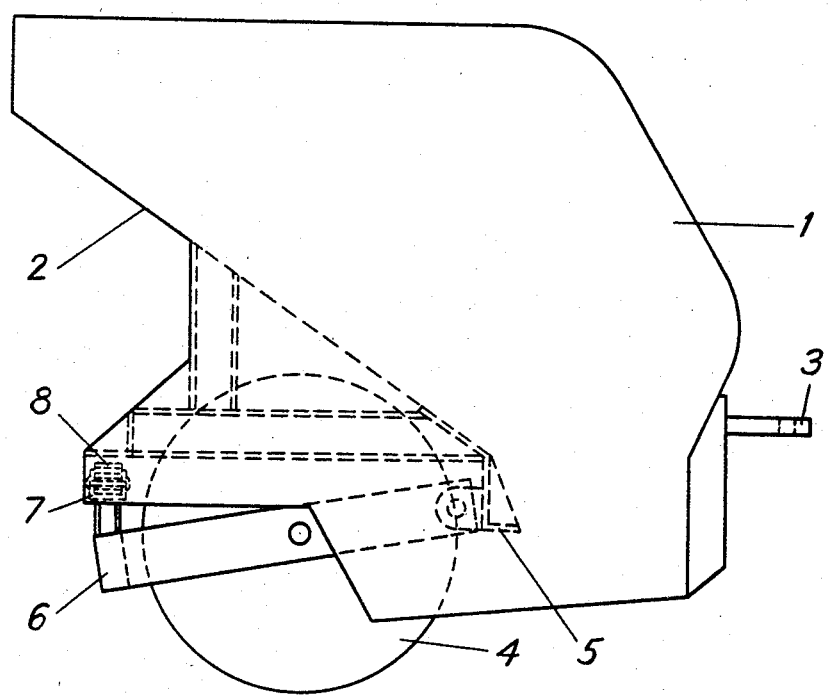
Figure 2:
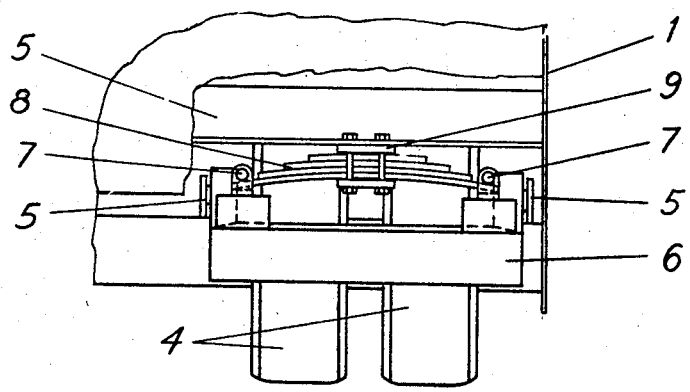

The construction and operation of the machine according to the invention will be fully disclosed hereinafter, reference being had to the accompanying drawing in which FIG. 1 is a side elevation of the machine, and FIG. 2 is a rear side elevation of the same machine with a rear side wall of the hopper being partly cut out.

There is indicated at 1 a hopper of a gravel spreader, provided with an inclined bottom 2. The front end of the spreader is provided with a traction device 3. In the present embodiment of the invention the spreader is supported by two pairs of wheels 4, of which the right pair, seen from the rear side of the spreader, is shown. In the chassis 5 of the spreader there is provided a movable frame part in form of a stirrup 6. The free ends of the two legs of the stirrup 6 are pivotally mounted in the chassis 5. In the middle of the legs there are pivoted the wheels 4. At both ends of the bottom of the stirrup 6 are arranged spring holders 7 for a pressure spring, here in the form of a laminated spring 8. In its intermediate part the spring 8 is by means of a holder device 9 fastened to the chassis 5.

When the hopper 1 is fully loaded the laminated spring 8 will be compressed and the bottom 2 of the hopper 1 will have a certain inclination in relation to the horizontal plane. As the hopper is drawn off, the load upon the laminated spring 8 will decrease and its intermediate part will be elevated. This means that the hopper 1 will turn more and more in clockwise direction about the pivot in the stirrup 6 causing the sliding angle to be larger and larger. The traction device 3 must be arranged in such a way, that it does not stop the inclination change of the hopper 1 just going on.

The laminated spring 8 is here shown on the one side of the stirrup 6 in relation to the wheels 4, whereas the mounting of the stirrup 6 in the chassis is on the other side of these wheels 4. Of course the same result can be obtained when placing the laminated spring 8 anywhere behind the mounting of the stirrup 6 in the chassis 5.

In addition to the advantage of the automatic inclination change of the hopper 1 another advantage is also obtained, namely that the wheels of the machine will be resiliently supported.

The invention is here above described in connection with a certain embodiment. Other embodiments are of course possible within the scope of the appended claims.

What I claim is:

1. A wheeled machine for spreading granular particles, including a hopper with an inclined bottom to facilitate the distribution of the granular particles from the hopper, supporting wheel means being pivotally mounted in a frame part of the machine, said frame part being pivotably connected to the hopper, firstly through a shaft, arranged parallel to the wheel axis, to enable the hopper to pivot in relation to said frame part, and secondly through a spring, said spring being adapted successively to pivot the hopper about said shaft as the granular particles are drawn off, thereby giving the hopper bottom a progressively increasing inclination in relation to the horizontal plane.

2. A wheeled machine according to claim 1, wherein said shaft is arranged at a front end of said frame part on one side of the wheels and that said spring in the form of a pressure spring is arranged at a rear end of said frame part on the other side of the wheels, which rear end is situated at a shorter distance from the highest part of the inclined hopper bottom than does the front end.

References Cited

UNITED STATES PATENTS

| 266,157 | 10/1882 | Hurt | 222—58 |
| 1,040,888 | 10/1912 | Comrie. | |
| 1,152,303 | 8/1915 | Davidson | 239—669 |
| 1,417,709 | 5/1922 | Yelm | 298—24 X |
| 1,920,206 | 8/1933 | Masury. | |
| 2,361,654 | 10/1944 | Roberts | 298—7 |

RICHARD J. JOHNSON, *Primary Examiner.*